United States Patent
Wahrenberg

(10) Patent No.: US 10,991,148 B2
(45) Date of Patent: Apr. 27, 2021

(54) MEDICAL IMAGE RENDERING METHOD AND APPARATUS

(71) Applicant: Canon Medical Systems Corporation, Otawara (JP)

(72) Inventor: Magnus Wahrenberg, Edinburgh (GB)

(73) Assignee: Canon Medical Systems Corporation, Otawara (JP)

( * ) Notice: Subject to any disclaimer, the term of this patent is extended or adjusted under 35 U.S.C. 154(b) by 8 days.

(21) Appl. No.: 16/101,627

(22) Filed: Aug. 13, 2018

(65) Prior Publication Data

US 2020/0051319 A1    Feb. 13, 2020

(51) Int. Cl.
| G06T 15/08 | (2011.01) |
| G06T 15/50 | (2011.01) |
| G06T 17/00 | (2006.01) |
| G06T 7/90  | (2017.01) |
| G06T 7/00  | (2017.01) |

(52) U.S. Cl.
CPC ........... *G06T 15/08* (2013.01); *G06T 7/0012* (2013.01); *G06T 7/90* (2017.01); *G06T 15/506* (2013.01); *G06T 17/00* (2013.01); *G06T 2207/10081* (2013.01); *G06T 2219/2012* (2013.01)

(58) Field of Classification Search
CPC ......... G06T 15/08; G06T 7/90; G06T 7/0012; G06T 15/506; G06T 17/00; G06T 2207/10081; G06T 2219/2012
See application file for complete search history.

(56) References Cited

U.S. PATENT DOCUMENTS

| 5,619,280 A * | 4/1997 | Yamashita ............... H04N 9/67 348/645 |
| 2016/0292913 A1 | 10/2016 | Wahrenberg |
| 2018/0174355 A1* | 6/2018 | Day ........................ G06T 15/08 |
| 2019/0011703 A1* | 1/2019 | Robaina .................. G02B 27/01 |

FOREIGN PATENT DOCUMENTS

| JP | 2007-226069 A | 9/2007 |
| JP | 2013-192856 A | 9/2013 |
| WO | WO-2018118786 A1 * | 6/2018 ......... G01N 33/5306 |

OTHER PUBLICATIONS

Varchola, A., Live Fetoscopic Visualization of 4D Ultrasound Data, PHD Thesis, TU Wien, 2012, Chapter 5, 46 pages.

* cited by examiner

*Primary Examiner* — Xin Sheng
(74) *Attorney, Agent, or Firm* — Oblon, McClelland, Maier & Neustadt, L.L.P.

(57) ABSTRACT

A medical image processing apparatus comprises processing circuitry configured to: obtain volumetric medical imaging data comprising a voxel value; obtain an opacity value corresponding to the voxel value; obtain an extinction color and/or transmission color corresponding to the voxel value; modify the extinction color and/or transmission color using the opacity value, wherein the modifying of the extinction color and/or transmission color is performed using a combined opacity model that combines a first opacity model and a second, different opacity model, such that the first opacity model makes a higher contribution to the modifying than the second opacity model at lower values of opacity, and the second opacity model makes a higher contribution to the modifying than the first opacity model at higher values of opacity; and render the volumetric medical imaging data using the modified extinction color and/or transmission color.

16 Claims, 4 Drawing Sheets

MEDICAL IMAGE RENDERING METHOD AND APPARATUS

FIELD

Embodiments relate generally to a method of image rendering, for example a method of image rendering in which a master opacity function is used to modify extinction colors and/or transmission colors used in global illumination rendering.

BACKGROUND

It is known to render images from volumetric imaging data, for example from volumetric medical imaging data. A set of volumetric imaging data may be referred to as an image volume. The set of volumetric imaging data may comprise a plurality of voxels with associated voxel values, with each voxel being representative of a corresponding spatial location in a medical imaging scan. For example, in the case of computer tomography (CT) data, the voxel value associated with each voxel may be a voxel intensity value that is representative of an attenuation of applied X-ray radiation at the location represented by the voxel.

Direct Volume Rendering (DVR) is a method for volume rendering. DVR may be considered to be an industry standard for volume rendering.

DVR renders a volumetric imaging data set by modelling a cloud of emissive material. Each point in a volume represented by the volumetric imaging data set is assigned properties of color and opacity. The color and opacity may be expressed as RGBA values, where R is red, G is green, B is blue and A is alpha. Typically, alpha (which may be written as A, a or α) is a measure of opacity in which a value of 0% indicates transparency and a value of 100% indicates full opacity.

In known DVR systems, a user may select rendering properties using a DVR model that comprises a set of color keys and an opacity curve.

A color key may be a color control point that may be used by a user to input or adjust a color value for a given intensity value. A set of color keys may be defined on a color curve. The color keys may be used to adjust the color curve. The color curve may be a plot of color against intensity value.

Color values (for example, color keys on a color curve) may be converted into tables of color values. A table may comprise a respective color value for each of a plurality of intensity values) by using interpolation and/or extrapolation. Interpolation may be used to interpolate color values between color keys. The common method for interpolation is linear, but cubic or higher order polynomials may be used. Extrapolation may be used to extrapolate color values before the first color key and after the last color key. A common extrapolation method is clamping to the nearest value.

The opacity curve may be a plot of opacity value versus voxel value, where voxel values are intensity values. Typically, low intensity values may be mapped to low opacity (high transparency), such that voxels that are representative of material having low attenuation (for example, voxels that are representative of air) are rendered as entirely or mostly transparent. High intensity values may be mapped to high opacity values, such that voxels that are representative of material having high attenuation (for example, voxels that are representative of bone) are rendered as entirely or mostly opaque. However, different mappings may also be made, for example to emphasize or de-emphasize particular tissue types in a resulting rendered image.

The term preset may be used to refer to a mapping of color values and opacity values to intensity values. For example, a preset may comprise an opacity curve as described above, and a transfer function that maps color values (for example, red, green and blue values) to intensity values.

In DVR, opacity is not dependent on color. A single opacity value is mapped to each intensity value. The single opacity value is used for the rendering of all color channels.

Global illumination (GI) is another type of volume rendering. Global illumination rendering has more degrees of freedom than DVR. In global illumination, a lighting model may be used that includes both direct illumination by light coming directly from a light source and indirect illumination, for example illumination by light that has been scattered from another surface.

In some global illumination rendering methods, an image is rendering from a volumetric imaging data set using a two-pass method in which a first pass creates a light volume, and a second pass uses the light volume to render an image for display.

The first pass may comprise a traversal from the light source into the volumetric imaging data set, in which virtual light is cast into the volumetric imaging data set. The irradiance due to the light source may be determined at each of a large array of points in the volumetric image data set using absorptive properties assigned to the voxels in dependence on the voxel intensities. The irradiance values at the array of points may be stored as a light volume. The light volume may be stored in memory. The light volume may be independent of the viewpoint.

A second pass may comprise a traversal through the light volume from a camera, using the light volume to provide global lighting information. Rays may be cast from the camera (for example, one ray for each pixel of the resulting rendered image), and irradiances from points along each ray may be integrated to provide pixel color values for a final rendered image.

In GI, each point in the volumetric imaging data set is assigned a property that may be referred to as an extinction color, absorption color, or attenuation color. In the description below we use the term extinction color. The extinction color may be expressed as an RGB color.

The extinction color for a point in the volume is representative of the color-dependent absorption of light at that point in the volume. The extinction color may be considered to be representative of the amount of energy removed for each channel at each point.

For example, consider a voxel having an extinction color $C_{extinction}$ of r, g, b=$\{0.3, 0.4, 0.7\}$. When virtual light passes through this voxel, 30% of the energy in the red channel is removed; 40% of energy in the green channel is removed; and 70% of the energy in the blue channel is removed.

We consider a change in irradiance between sampling points along a ray using the extinction color.

$$I_{red}(i+1)=I_{red}(i)-C_{extinction\_red}I_{red}(i)=0.7I_{red}(i)$$

where $I_{red}(i)$ is the irradiance in the red channel at voxel i and $I_{red}(i+1)$ is the irradiance in the red channel at voxel i+1, and $C_{extinction\_red}$ is the red component of the extinction colour $C_{extinction}$.

Similarly, $$I_{green}(i+1)=I_{green}(i)-C_{extinction\_green}I_{green}(i)=0.6I_{green}(i)$$

$$I_{blue}(i+1)=I_{blue}(i)-C_{extinction\_blue}I_{blue}(i)=0.3I_{blue}(i)$$

A transmission color $C_{transmission}$ may also be defined. The transmission color represents the amount of energy remaining in each channel, whereas the extinction color represents an amount of energy that is removed from each channel. The transmission color is the fraction of light that manages to pass through the material.

$$C_{transmission\_red} = 1 - C_{extinction\_red}$$

$$C_{transmission\_green} = 1 - C_{extinction\_green}$$

$$C_{transmission\_blue} = 1 - C_{extinction\_blue}$$

Consider the example above in which the extinction color $C_{extinction}$ is r, g, b={0.3, 0.4, 0.7}. The transmission colour $C_{transmission}$ is then r, g, b={0.7, 0.6, 0.3}.

The change in irradiance between one sample and the next sample may also be written in terms of transmission color as, for example, $$I_{red}(i+1) = C_{transmission\_red} I_{red}(i) = 0.7 I_{red}(i)$$

$$I_{green}(i+1) = C_{transmission\_green} I_{green}(i) = 0.6 I_{green}(i)$$

$$I_{blue}(i+1) = C_{transmission\_blue} I_{blue}(i) = 0.3 I_{blue}(i).$$

The use of extinction colors and/or transmission colors that are color-dependent may enable realistic tissue effects due to chroma-dependent attenuation. For example, white light passing through human tissue may become redder as it passes through the tissue due to the tissue preferentially absorbing blue and green components of the white light. The use of extinction colors may allow such reddening, and other tissue effects, to be rendered. For example, in the case above in which a voxel has an extinction color of r, g, b={0.3, 0.4, 0.7}, green and blue are absorbed more strongly than red, and so light passing through that voxel will be reddened.

Rendering using a global illumination model is starting to become available to users. When the GI model is used correctly, the results may be very good. However, it has been found that many users find it difficult to create excellent images using GI. In particular, users may find it very difficult to create presets in GI.

Users may be used to using a single opacity curve in DVR rendering. The reliance of GI on color-dependent optical density and/or color-dependent absorption may mean that the use of a single (non-color-dependent) opacity curve may be considered not to be compatible with a GI model. Optical density describes energy loss through both absorption and scattering.

One option could be to allow users of GI models to define separate opacity curves for each color. However, it has been found that users find it extremely difficult to define separate opacity curves in this manner. The different absorption of different colors may cause colors to appear in rendering in a way that was not anticipated by the user when the user defined the opacity curves. If the user wishes to make a change in the appearance of a rendered color, the user may not know which change should be made to the preset to obtain the desired change in appearance of the rendered color.

BRIEF DESCRIPTION OF THE DRAWINGS

Embodiments are now described, by way of non-limiting example, and are illustrated in the following figures, in which.

DETAILED DESCRIPTION

Certain embodiments provide a medical image processing apparatus comprising processing circuitry configured to: obtain volumetric medical imaging data comprising a voxel value; obtain an opacity value corresponding to the voxel value; obtain an extinction color and/or transmission color corresponding to the voxel value; modify the extinction color and/or transmission color using the opacity value, wherein the modifying of the extinction color and/or transmission color is performed using a combined opacity model that combines a first opacity model and a second, different opacity model, such that the first opacity model makes a higher contribution to the modifying than the second opacity model at lower values of opacity, and the second opacity model makes a higher contribution to the modifying than the first opacity model at higher values of opacity; and render the volumetric medical imaging data using the modified extinction color and/or transmission color.

Certain embodiments provide a medical image rendering method comprising: obtaining volumetric medical imaging data comprising a voxel value; obtaining an opacity value corresponding to the voxel value; obtaining an extinction color and/or transmission color corresponding to the voxel value; modifying the extinction color and/or transmission color using the opacity value, wherein the modifying of the extinction color and/or transmission color is performed using a combined opacity model that combines a first opacity model and a second, different opacity model, such that the first opacity model predominates at low values of opacity and the second opacity model predominates at high values of opacity; and rendering the volumetric medical imaging data using the modified extinction color and/or transmission color.

Certain embodiments provide a medical image processing apparatus comprising processing circuitry configured to: obtain volumetric medical imaging data comprising a voxel value; obtain an extinction color and/or transmission color corresponding to the voxel value; obtain a value for a deepening factor that is representative of saturation; modify the extinction color and/or transmission color using the value for the deepening factor; and render the volumetric medical imaging data using the modified extinction color and/or transmission color.

Figure 1:
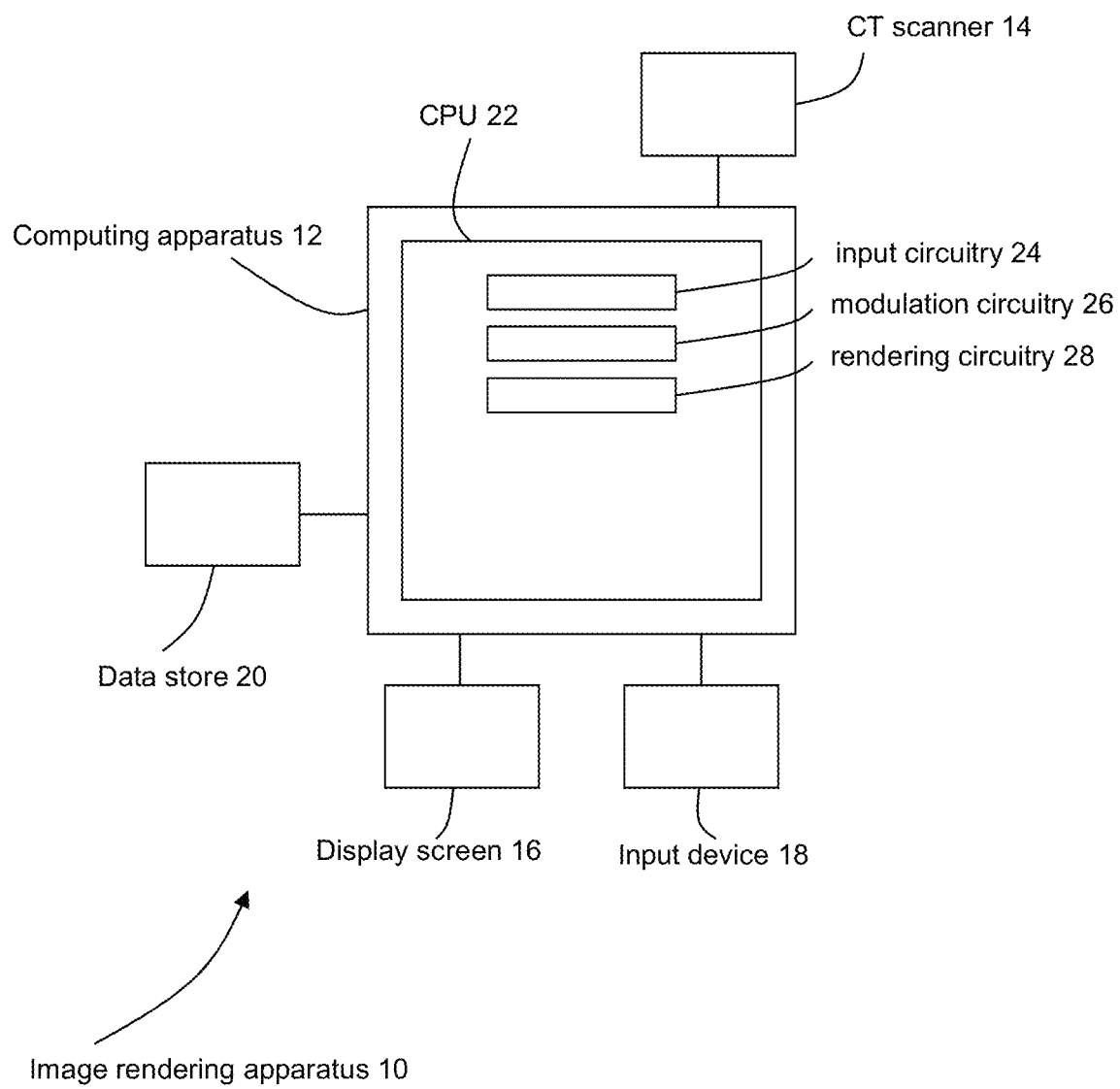
FIG. 1 is a schematic illustration of an apparatus in accordance with an embodiment.

An image rendering apparatus 10 according to an embodiment is illustrated schematically in FIG. 1. The image rendering apparatus 10 comprises a computing apparatus 12, which in this case is a personal computer (PC) or workstation. The computing apparatus 12 is connected to a CT scanner 14, a display screen 16 and an input device or devices 18, such as a computer keyboard and mouse.

In other embodiments, the CT scanner 14 may be supplemented or replaced by a scanner in any appropriate imaging modality, for example a cone-beam CT scanner, MRI (magnetic resonance imaging) scanner, X-ray scanner, PET (position emission tomography) scanner, SPECT (single photon emission computed tomography) scanner, or ultrasound scanner.

In the present embodiment, sets of volumetric imaging data are obtained by the CT scanner 14 and stored in data store 20. The image rendering apparatus 10 receives sets of volumetric imaging data from data store 20.

In other embodiments, sets of image data may be obtained by any suitable scanner and stored in data store 20. In alternative embodiments, the image rendering apparatus 10 receives sets of volumetric imaging data from a remote data store (not shown) which may form part of a Picture Archiving and Communication System (PACS). The image rendering apparatus 10 may not be connected to a scanner 14.

Computing apparatus 12 provides a processing resource for automatically or semi-automatically processing volumetric imaging data sets. Computing apparatus 12 comprises a central processing unit (CPU) 22.

The computing apparatus 12 includes input circuitry 24 configured to receive user input; modulation circuitry 26 configured to modify extinction colors and/or transmission colors in accordance with opacity; and rendering circuitry 28 configured to render images from volumetric data.

In the present embodiment, the circuitries 24, 26, 28 are each implemented in computing apparatus 12 by means of a computer program having computer-readable instructions that are executable to perform the method of the embodiment. However, in other embodiments, the various circuitries may be implemented as one or more ASICs (application specific integrated circuits) or FPGAs (field programmable gate arrays).

The computing apparatus 12 also includes a hard drive and other components of a PC including RAM, ROM, a data bus, an operating system including various device drivers, and hardware devices including a graphics card. Such components are not shown in FIG. 1 for clarity.

Figure 2:
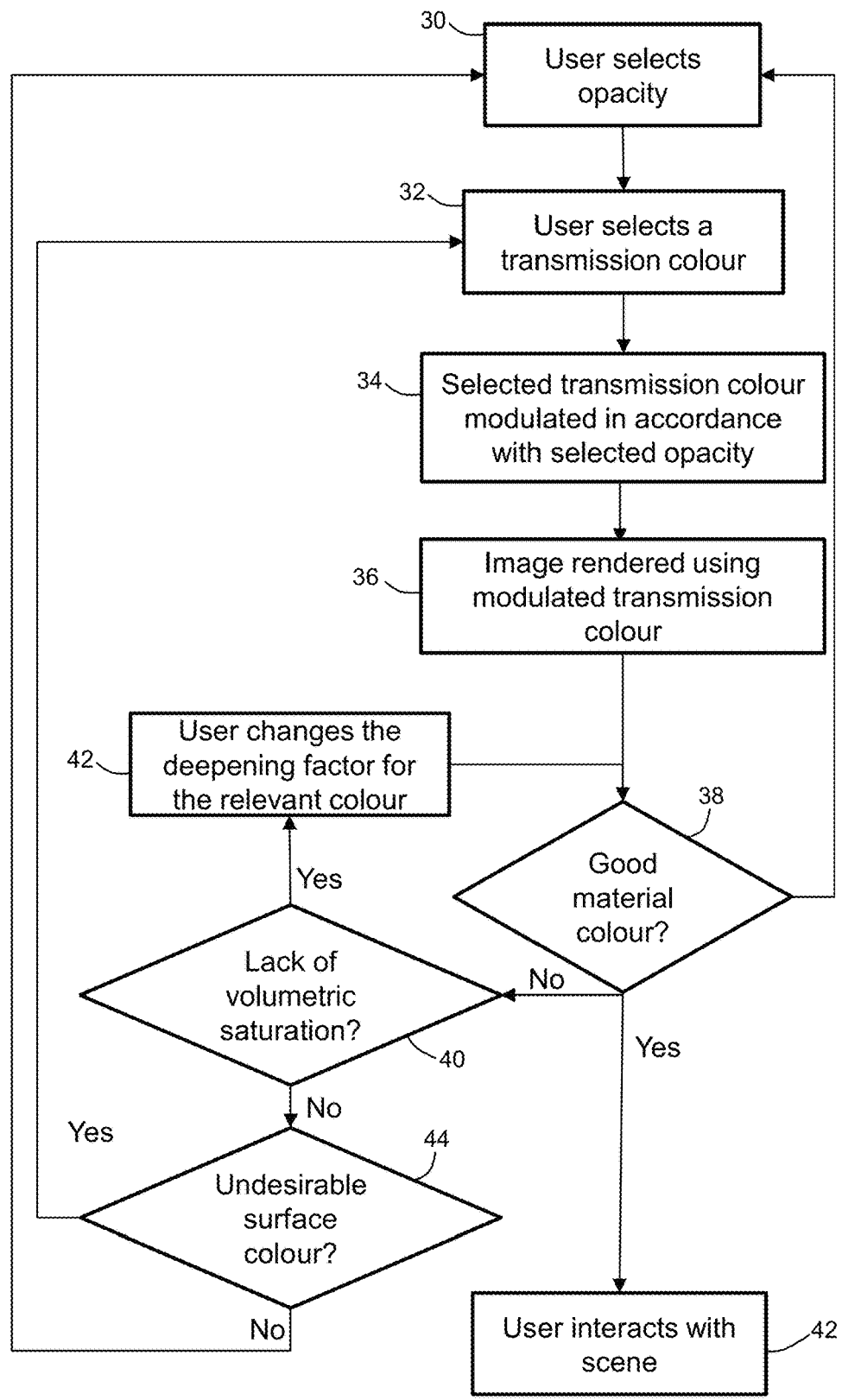
FIG. 2 is a flow chart illustrating a rendering method in accordance with an embodiment.

The apparatus of FIG. 1 is configured to perform a series of stages as illustrated in overview in the flow chart of FIG. 2.

FIG. 2 is a flow chart illustrating in overview a method of rendering in accordance with an embodiment. In the embodiment of FIG. 2, the user selects a single opacity value for each material, for example by using a single master opacity curve. The user's selection is then translated into opacity properties that are suitable for use in GI where opacity is color-dependent. The user may find the use of a single master opacity curve to be intuitive. The user may be familiar with the use of a single master opacity curve in DVR rendering.

In the below embodiments, for simplicity we consider the user's selection of properties (opacity, transmission color and/or extinction color, and optionally deepening factor) for a range of intensity values that are representative of a single material. The user selects only one opacity and one transmission color and/or extinction color (and optionally one deepening factor).

However, in practice the user may select different properties for multiple different materials, for example different tissue types. In some embodiments, for a given material, the user selects properties that vary with intensity within a range of intensities that are representative of that material.

Turning to FIG. 2, at stage 30, the user selects an opacity value $\alpha$ for a material, for example soft tissue. The opacity value may be a value from 0% (fully transparent) to 100% (fully opaque). The user may use any suitable input device and input method to select the opacity value. The input circuitry 24 receives an input which comprises or represents the opacity value selected by the user.

In alternative embodiments, the user may select a transparency value T, where transparency is related to opacity by $T = 1 - \alpha$. In the description below, references to opacity value may be applied to transparency value and vice versa, if a suitable conversion between opacity value and transparency value is made.

In other embodiments, the user may select opacity values for any suitable intensity values or ranges of intensity values. The user may define an opacity curve that relates opacity to intensity value over a range of intensity values. The opacity curve may be referred to as a master opacity curve, master opacity function, or master opacity ramp.

In further embodiments, the input circuitry 24 uses one or more stored opacity values instead of receiving user input. The stored opacity values may have been predetermined using any suitable method.

As discussed above, GI does not use opacity in the same way as DVR. However, the user may expect that a high opacity input will result in a more opaque appearance of the material in a rendered image, and a low opacity input will result in a more transparent appearance of the material in a rendered image.

At stage 32, the user selects a transmission color $C_{transmission}$. The transmission color comprises red, green and blue components. For example, the transmission color may be r, g, b={0.7, 0.6, 0.4} as described above.

The user may use any suitable input device and method to select the transmission color. For example, the user may select the color on a color picker, or input numerical values. The input circuitry 24 receives an input which comprises or represents the transmission color selected by the user.

In other embodiments, the user may select an extinction color instead of a transmission color. As described above, a transmission color may be converted into an extinction color and vice versa. In the description below, references to transmission color may be applied to extinction color and vice versa, if a suitable conversion between extinction color and transmission color is made.

In the present embodiment, the user selects one transmission color for the range of intensity values for which the opacity value was determined at stage 30. In other embodiments, the user may select transmission colors and/or extinction colors for any suitable intensity values or ranges of intensity values. The user may select transmission colors and/or extinction colors for multiple materials, for example multiple tissue types. The user may create, select, or modify a function, for example a transfer function, which relates transmission color and/or extinction color to intensity value over a range of intensity values.

In further embodiments, the input circuitry 24 uses one or more stored transmission colors and/or extinction colors instead of receiving user input. The stored transmission colors and/or extinction colors may have been predetermined using any suitable method.

At stage 34, the modulation circuitry 26 modifies the transmission color that was selected at stage 32. In the present embodiment, the modulation circuitry 26 modifies the transmission color using the opacity value that was selected at stage 30. The modulation circuitry modifies the transmission color using a combination of two opacity models, which in the present embodiment may also be referred to as opacity modulation models. The combination of the two opacity models may be referred to as a combined opacity model, or a combined opacity modulation model.

In the present embodiment, the two opacity models are an extinction modulation model and a transmission modulation model. The extinction modulation model modifies an extinction color by multiplying it by an opacity value. The transmission modulation model modifies a transmission color by multiplying it by a transparency value.

In embodiments described below, the modifying of the transmission color comprises modulation. The term modulation is used to mean multiplication by a single factor. In other embodiments, any suitable way of modifying the transmission color and/or extinction color may be used, which may or may not comprise a modulation.

We express the modification of the transmission color using the combined opacity model using the equation below.

$$C'''_{transmission} = A(\alpha)C'_{transmission} + B(\alpha)C''_{transmission}$$

where $C'''_{transmission}$ is the transmission colour as modified by the combined opacity model, $C'_{transmission}$ is the transmission color as modified by the extinction modulation model, $C''_{transmission}$ is the transmission colour as modified by the transmission modulation model, and $A(\alpha)$ and $B(\alpha)$ are linear functions of opacity.

In other embodiments, any suitable functions may be used for $A(\alpha)$ and $B(\alpha)$. In some embodiments, the functions may not be linear.

The extinction modulation model modulates an extinction color by multiplying it by an opacity value.

$$C'_{extinction} = \alpha C_{extinction}$$

Written in terms of transmission color, $$C'_{transmission} = 1 - C'_{extinction} =$$
$$1 - \alpha C_{extinction} = 1 - \alpha(1 - C_{transmission}) = 1 - \alpha + \alpha C_{transmission}$$

The transmission modulation model modulates a transmission color by multiplying it by a transparency value.

$$C''_{transmission} = T C_{transmission}$$

Written in terms of opacity, $$C''_{transmission} = (1-\alpha)C_{transmission}$$

In the present embodiment, the extinction modulation model and transmission modulation model are combined as a linear combination. The extinction modulation model and transmission modulation model are combined such that if the opacity value is 0, then only the extinction modulation model is applied. If the opacity value is 100%, only the transmission modulation model is applied. For values of opacity between 0% and 100%, a linear combination of the opacity models is applied. In the present embodiment, this is achieved by setting $A(\alpha)=(1-\alpha)$ and $B(\alpha)=\alpha$.

Expanding out and substituting the equations above gives us:

$$C'''_{transmission} = A(\alpha)C'_{transmission} + B(\alpha)C''_{transmission}$$
$$= (1-\alpha)(1 - \alpha + \alpha C_{transmission}) +$$
$$\alpha(C_{transmission} - \alpha C_{transmission})$$
$$= (-2\alpha^2 + 2\alpha)C_{transmission} + \alpha^2 - 2\alpha + 1$$

A linear mapping function between the two linear models produces a quadratic master opacity mapping. The function relating the original transmission color $C_{transmission}$ that is input by the user and the modified transmission color $C'''_{transmission}$ is a quadratic function of opacity.

Figure 3:
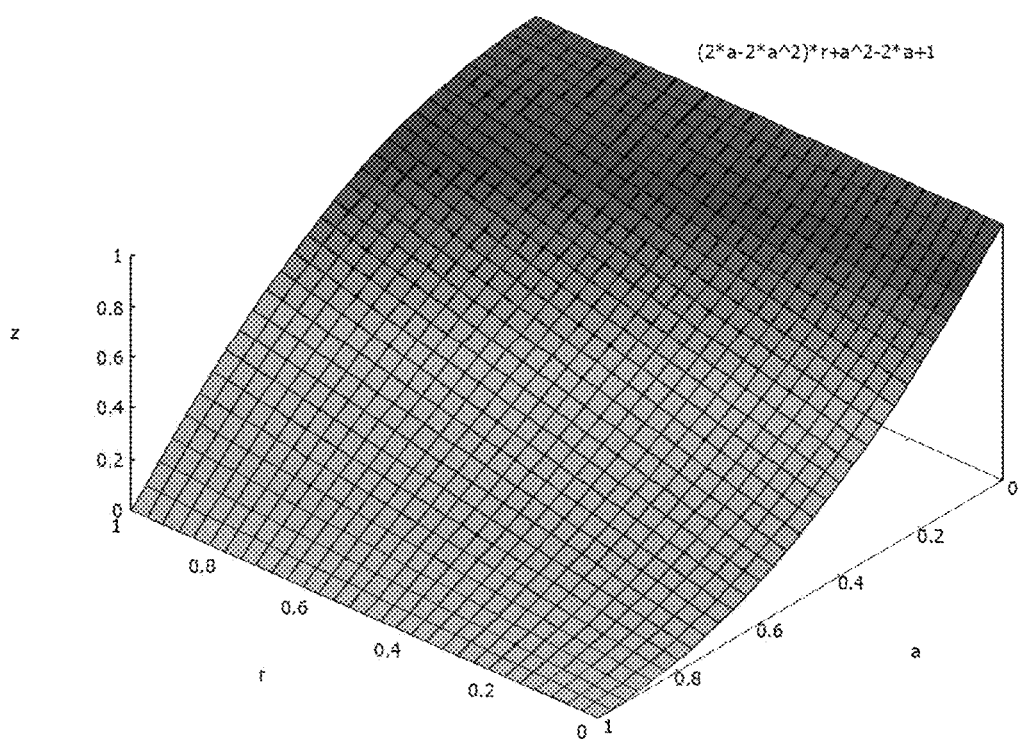
FIG. 3 is a plot of a mapping function.

FIG. 3 shows a plot of the mapping function of $C'''_{transmission}$. The vertical axis, z, of FIG. 3 shows transmission of red as a function of a selected red amount, r, and opacity, which is indicated by a in FIG. 3. The selected red amount is the amount of red in the transmission color selected by the user at stage 32.

The combined opacity model is selected such that the modifying of the transmission color by the opacity value has certain properties that are expected by the user.

In particular, if the user sets the opacity value to 0, the user will expect the material to be rendered as transparent. In the combined opacity model above, setting the opacity value to 0 sets the transmission color to 1, i.e. fully transparent.

If the user sets the opacity value to 100%, the user will expect the material to be rendered as opaque. In the combined opacity model above, setting the opacity value to 1 sets the transmission color to 0, i.e. fully opaque.

Using either the extinction modulation model or transmission modulation model alone would not provide an opacity model having the properties expected by a user. This point will be discussed in more detail below.

In other embodiments, a different combined opacity model may be used. The combined opacity model may be a combination of any two or more opacity models, for example any linear combination of two or more opacity models, such that the first opacity model has a higher contribution to the modifying of the transmission color than the second opacity model at lower values of opacity (for example, values of opacity near zero), and the second opacity model has a higher contribution to the modifying of the transmission color that the first opacity model at higher values of opacity (for example, values of opacity near 100%).

The combined opacity model may be any model that is smooth and continuous. In some embodiments, the combined opacity model may be any model that has the property of providing a fully opaque material at 100% opacity and a fully transparent material at 0% opacity.

A first opacity model and a second opacity model may be defined such that if the opacity value is zero, the transmission color is modified using the first opacity model. If the opacity value is 100%, the transmission color is modified using the second opacity model. For values between 0% opacity and 100% opacity, the transmission color is modified using a linear combination of the first opacity model and the second opacity model.

In further embodiments, any analytical interpolation function may be used to interpolate between the first opacity model and the second opacity model. The interpolation function may comprise, for example, a curve or a piecewise analytical function. In some embodiments, an interpolation function is implemented by using a lookup table to interpolate between the models.

In some embodiments, first, second and third ranges of intensity values are defined. In a first, lower range of intensity values, only the first opacity model is used. In a second, higher range of intensity values, only the second opacity model is used. In a third range of intensity values that is intermediate between the first range and second range, a combination of the first opacity model and second opacity model is used, for example a linear combination.

At the end of stage 34, the modulation circuitry 26 outputs the modified transmission color $C'''_{transmission}$.

At stage 36, the rendering circuitry 28 renders an image from the volumetric imaging data set using the modified transmission color that was output at stage 34. In the present embodiment, the rendering comprises global illumination rendering. In other embodiments, the rendering may comprise any physical rendering method in which a color-dependent absorption and/or optical density is used. A physical rendering method may be a rendering method that attempts to emulate real-world optical behavior.

By modifying the transmission color using the combined opacity model as described above, a user choice of a single opacity value may be applied to a rendering model in which opacity varies by color.

The modified transmission color may be used in an irradiance calculation as shown below:

$$I_{red}(i+1) =$$
$$C'''_{transmission\_red} I_{red}(i) = ((-2\alpha^2 + 2\alpha)C_{transmission} + \alpha^2 - 2\alpha + 1)I_{red}(i)$$

with corresponding equations for $I_{green}$ and $I_{blue}$.

In the present embodiment, the same modified transmission color is used for all instances of the same material. In other embodiments, different transmission colors and/or different modifications may be used for different regions. For example, tissue representing different organs may be segmented, and different colors may be used in rendering the different organs.

At stage 38, the user views the image that was rendered at stage 36, and decides whether the rendered color of the material for which the user had selected the transmission color is as good as the user had expected. If the user determines that the rendered color is good, the method of FIG. 2 proceeds to stage 42. The user may decide that the rendered color is good if the material is rendered with color properties (for example, hue and saturation) that were desired by the user.

If the user determines that the rendered color is not good enough, than the method of FIG. 2 proceeds to stage 40.

At stage 40, the user decides whether, in the user's opinion, the color of the material in the rendered image lacks volumetric saturation. Volumetric saturation may be described as a deepness or richness of color. The user may wish the color of the material to appear more saturated.

If the user decides that the color of the rendered material does not lack volumetric saturation, the process of FIG. 2 proceeds to stage 44.

At stage 44, the user decides whether, in the user's opinion, the color of the rendered material does not look good enough because it has an undesirable surface color. If the user considers the surface color to be undesirable, the process of FIG. 2 returns to stage 32, and the user selects a new transmission color. Stages 34 and 36 are repeated using the original opacity value and the newly-selected transmission color to create a new rendered image.

If the user determines that the surface color is not undesirable, and has already determined at stage 40 that the material does not lack volumetric saturation, then the process of FIG. 2 returns to stage 30 and the user selects a new value for opacity.

Stages 34 and 36 are repeated using the newly-selected opacity value and the original transmission color to create a new rendered image.

We now consider what happens at stage 40 if the user decides that, in the user's opinion, the rendered material lacks volumetric saturation. If the user decides that the material lacks volumetric saturation, the process of FIG. 2 proceeds to stage 42. At stage 42, the user is given the opportunity to change a deepening factor. The deepening factor is a positive numerical value, which may also be referred to as a volumetric deepening factor.

In some embodiments, the user interface displayed to the user comprises a saturation dial. The saturation dial may be attached to each color control point (for example, a color key on a color curve), or attached when the mouse is near a color control point. The user may control the deepening factor by operating the saturation dial.

In the present embodiment, the deepening factor is set to 1 by default. If the user increases the deepening factor above 1, the color becomes more saturated.

In other embodiments, the user may decide that the material color has too much volumetric saturation. The user may choose to decrease the deepening factor such that the color becomes less saturated. For example, if the user has already applied a deepening factor in a previous iteration of the method of FIG. 2, the user may decide to reduce the deepening factor applied.

The deepening factor may be implemented using any suitable method. In the present embodiment, the deepening factor is applied as an adjustment to the modification of the transmission color that was made using the combined opacity model.

In the present embodiment, the deepening factor d provides a further modulator of the color that is not directly related to the opacity. In other embodiments, the deepening factor d may be used to modify the color in any appropriate manner.

In the present embodiment, $$C''''_{transmission} = \min((-2\alpha^2 + 2\alpha)dC_{transmission} + \alpha^2 - 2\alpha + 1, 1)$$

where $C''''_{transmission}$ is the transmission colour as modified by both the combined opacity model and the deepening factor, and d is the deepening factor.

The deepening factor allows the user to saturate the color of tissue without producing oversaturated colors (colors with color channel values above 1) which could not possibly be represented by the user interface.

Figures 4A, 4B, 4C:
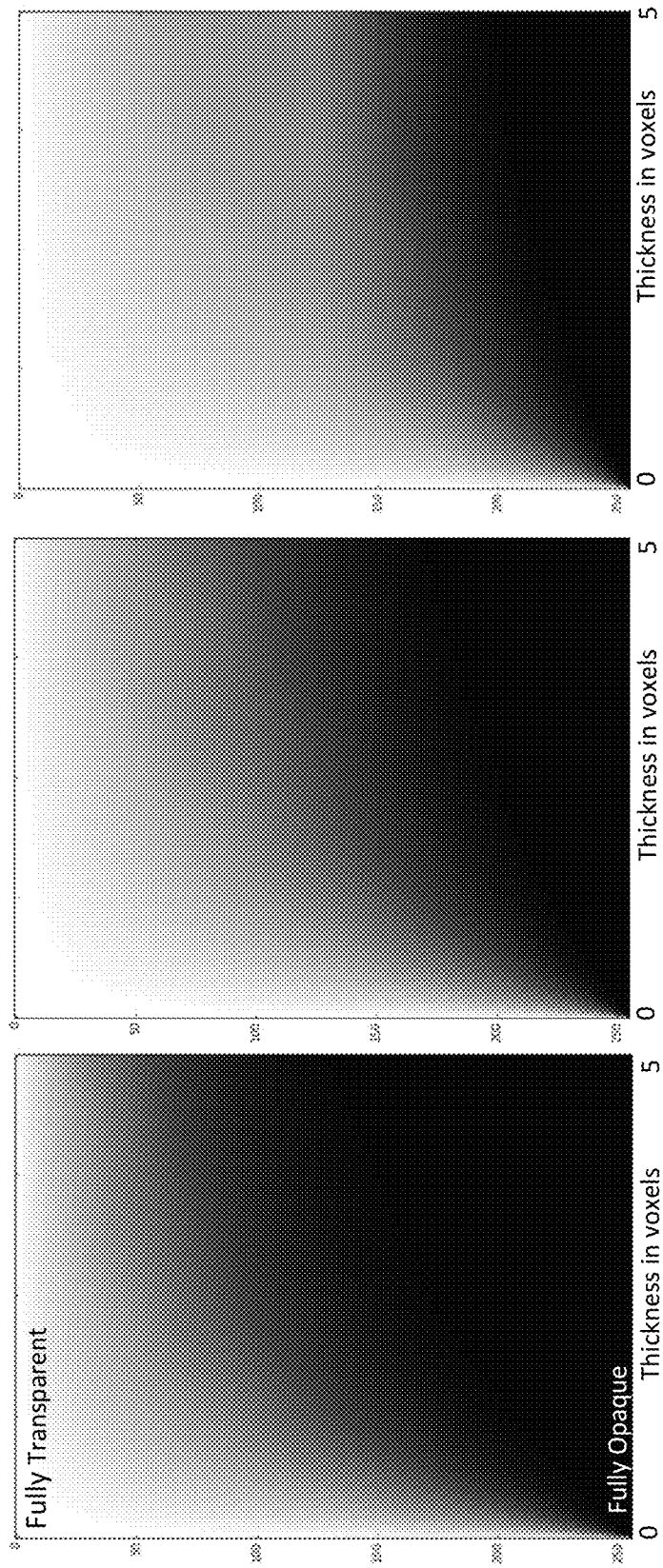
FIGS. 4a, 4b and 4c are plots of color against opacity and thickness for a deepening factor of 1, 1.5 and 2 respectively.

FIGS. 4a, 4b and 4c are plots of color against opacity and thickness of material. FIG. 4a shows colors for a deepening factor of 1. FIG. 4b shows colors for a deepening factor of 1.5. FIG. 4c shows colors for a deepening factor of 2. Although the colors are intended to show as red, the plots have been re-rendered in greyscale. Saturated red shows as a medium grey. We note that in FIGS. 4a, 4b and 4c, opacity is shown on a scale from 0 to 255, where 255 is representative of 100% opacity.

Where the deepening factor is increased, the band of opacity values for which a saturated red color is produced is increase, and the red color in that band intensifies.

In the present embodiment, the user changes a deepening factor to change the appearance of a material in the rendered image. In other embodiments, the user may use the deepening factor to change the appearance of any number of materials. The user may select which parts of a transfer function have increased volumetric saturation.

In some embodiments, the user may choose to apply a deepening factor to certain regions of an images, for example to certain anatomical features such as organs.

In other embodiments, the deepening factor may be applied automatically. In some embodiments, the deepening factor is used to indicate additional information in an image.

In some embodiments, the deepening factor is used as a degree of freedom in image fusion. The deepening factor may be defined spatially and used for fusing a secondary volume. The secondary volume may comprise data obtained using any suitable modality, for example CT perfusion, PET, SPECT, ultrasound Doppler, ultrasound electrograph, simulated fluid dynamics.

The modulation circuitry 26 may apply a deepening factor in dependence on PET uptake or other functional parameters. For example, the deepening factor may be used to deepen the colors of the tissue where there is PET uptake. A respective value for the deepening factor for each of a plurality of positions in the image volume may be determined based on a PET uptake at each of those positions.

In other embodiments, the deepening of the color may be representative of any suitable quantity, for example, a pressure, a velocity or a vorticity.

In the method of FIG. 2, the deepening factor is applied in combination with modifying of the transmission color using the combined opacity model. In other embodiments, the deepening factor may be applied without any modifying of the transmission color or extinction color.

Stages of FIG. 2 may be repeated until the user decides at stage 38 that the material color is good. Once the user decides that the material color is good, the method of FIG. 2 proceeds to stage 42. At stage 42, the user may interact with the rendered image. The user may navigate around the rendered image, for example by changing a viewing orientation and/or a level of zoom. The user may add or move one or more clip planes. The user may identify anatomical features in the rendered image, or obtain other medical information. The user may perform additional processes on the rendered image, for example segmentation.

The combined opacity model uses a combination of the extinction modulation model and the transmission modulation model to produce results at each end of the opacity spectrum (0% opacity and 100% opacity) which may be similar to the results that are expected by a user. The extinction modulation model is applied at the low opacity end of the opacity spectrum, and the transmission modulation model is applied at the high opacity end of the opacity spectrum. The extinction modulation model makes a higher contribution to the modification of the transmission color at lower values of opacity, and the transmission modulation model makes a higher contribution to the modification of the transmission color at higher values of opacity.

By using the method of FIG. 2, a user interface may be provided in which all colors are represented in the user interface in a way that is reasonably easy for the user to understand. A user may find that changing an opacity value produces a change in a rendered image that is as expected by the user.

The use of the combined opacity model may allow the use of a single set of color keys. The use of a single set of color keys may be very desirable. The use of a single set of color keys may make the rendering easier and more intuitive for a user. The user may be able to adjust color of a rendered image in a way that provides expected and intuitive results.

A user may be used to using a DVR model for rendering. The master opacity curve that is typically used in DVR does not relate directly to the chromatic optical density values that are used in other methods such as GI, because the DVR model does not provide an accurate physical representation. However, in some circumstances the use of a single opacity curve may be important to a user's understanding of an optical model.

The master opacity ramp may be considered to be a cornerstone of a preset user interface. The use by the user of a single opacity curve may bridge a gap in understanding between the DVR model that the user is experienced in using, and a new GI model. Keeping a model as close as possible to the DVR model from the user's perspective may ease a transition between the technologies. By providing a user with a familiar way to manage color and opacity, the user's ability to create presets may be enhanced.

In the method of FIG. 2, the master opacity ramp is kept in a way that makes the model behave as expected. It may be expected that 0 opacity should not attenuate the light at all. It may be expected that full opacity should attenuate all of the light, because full opacity is representative of infinite optical density. A principle of the method used may be that colors picked by the user should be preserved as far as possible. A deepening factor may be used to enhance a volumetric effect in places.

In the combined opacity model, a mapping function is created between the two models (extinction modulation model and transmission modulation model) so that the system acts like the extinction modulation model near opacity=0 and smoothly transitions to the transmission modulation model as opacity reaches full opacity. When opacity is low, the combined opacity model behaves like the extinction modulation model. When opacity is high, the combined opacity model behaves like the transmission modulation model.

The combination of the extinction modulation model and transmission modulation model has properties that may be preferable to the properties of either the extinction modulation model alone, or the transmission modulation model alone.

We consider what would happen if the extinction modulation model alone were to be used to modify the transmission color, i.e. if only the extinction modulation model were used across the full range of opacity values from 0% to 100% opacity.

As described above, in the extinction modulation model the extinction color is modified by multiplying by opacity.

$$C'_{extinction} = \alpha C_{extinction}$$

where $C_{extinction}$ is the extinction colour modified using the extinction modulation model, and a is opacity.

We consider what happens in the extreme cases of opacity=0% and opacity=100%. As an example, we again consider the case in which $C_{extinction} = \{0.3, 0.4, 0.7\}$ and we consider the example of the red channel.

We consider a change in irradiance between sampling points along a ray using the modified extinction color that is modified using the extinction modulation model.

$$I_{red}(i+1) = I_{red}(i) - C'_{extinction\_red} I_{red}(i) =$$
$$I_{red}(i) - \alpha C_{extinction\_red} I_{red}(i) = (1 - 0.3\alpha) I_{red}(i)$$

If the input opacity is 0, no energy is removed from the system, as may be expected by the user.

If the input opacity is 100%, $I_{red}(i+1)=(1-0.3\alpha)I_{red}(i)$. At full opacity, the extinction modulation model only removes 30% of the energy from the red channel.

Therefore, if the extinction modulation model were to be used alone, a glowing effect may be observed when the opacity that is input by the user is high.

A light simulation may have a concept of energy, and of the preservation of energy. A system may be considered to be energy preserving if a sum of absorption and scattering equals the irradiance of a region. For each region, the incoming light is equal to the outgoing light plus light absorption. The concept of energy preservation may be applied to small local regions and/or to a scene as a whole.

If the extinction modulation is used alone, the system in which it is used is not energy preserving in the extreme case of opacity=100%. The user may be surprised that setting opacity to 100% does not remove all energy from the system.

This example of an approach to opacity has some properties which users may find confusing or undesirable.

We now consider what would happen if the transmission modulation model alone were to be used to modify the transmission color, i.e. if only the transmission modulation model were used across the full range of opacity values from 0% to 100% opacity.

In the transmission modulation model, the modulation circuitry modulates the transmission color by multiplying the transmission color by the transparency.

$$C''_{transmission} = TC_{transmission}$$

where $C_{transmission}$ is the transmission colour, T is the transparency, and $C''_{transmission}$ is the modified transmission colour which is modified using the transmission modulation model.

We consider again the example of $C_{extinction} = \{0.3, 0.4, 0.7\}$ and $C_{transmission} = \{0.7, 0.6, 0.3\}$.

Using the transmission modulation model, $$I_{red}(i+1) =$$
$$C''_{transmission\_red} I_{red}(i) = (1-\alpha) C_{transmission\_red} I_{red}(i) = 0.7(1-\alpha) I_{red}(i)$$

If the input opacity is 100% (full opacity), $I_{red}(i+1)=0$. All of the intensity is removed, as may be expected by the user.

If the input opacity is 0, $I_{red}(i+1)=0.7I_{red}(i)$.

Therefore, inputting zero opacity (full transparency) in the transmission modulation model results in the removal of 30% of the red intensity. This would not be expected by the user.

It has been found that the use of the transmission modulation model alone may create unexpected shadows in an image, which may be described as rogue shadows. For example, in an image that is rendered using the transmission modulation model alone, objects that should be fully transparent may cast a shadow.

We have explained above that implementing a single master opacity using either the extinction modulation model alone or the transmission modulation model above may give undesired effects that are unexpected by the user, particularly in extreme cases.

Another option for using a master opacity could be to use the master opacity as an average channel opacity, for example using $$3\alpha = kC_{extinction\_red} kC_{extinction\_green} C_{extinction\_blue}$$

However, it has been found that an average channel opacity model may produce unexpected color changes. For example, the model in the equation above has been found to change the blue balance, and is unable to transform full opacity into completely transparent. Even if opacity is set to 100%, the model still removes energy from the color channels.

By using the combined opacity model, transmission colors as selected by a user may correspond well to a final rendered output. For values of opacity that are near 0, the first opacity model predominates, which is the extinction modulation model. For values of opacity that are near 100%, the second opacity model predominates, which is the transmission modulation model.

Unexpected special cases (for example, a material glowing when it is supposed to be fully opaque, or a material casting shadows when it is supposed to be fully transparent) may be reduced or eliminated. The use of the combined opacity model may be fast. It may require no costly exponential functions.

Certain embodiments provide: a medical imaging method comprising: a physical rendering method using wavelength/color dependent optical density/absorption; and a master opacity ramp in which the optical model is based on a smooth transition between an extinction modulation model and a transmission modulation model from the points where these models produce desirable optical properties.

The transition may be based on applying the extinction model at a low opacity end of a spectrum and the transmission model at a high end of the spectrum. An analytical interpolation function is used to interpolate between the models. An arbitrary function may be used through a lookup table to interpolate between the models. A deepening factor may be added to increase/decrease the volumetric saturation in the resulting optical model. A saturation UI dial may be attached to each color control point or attached when the mouse is near a color control point. The deepening factor may be defined spatially and used for fusing a secondary volume. The secondary volume may be based on CT perfusion, PET, SPECT, Ultrasound Doppler, Ultrasound electrograph, simulated fluid dynamics.

Certain embodiments provide a medical image processing apparatus using global illumination for rendering comprising: processing circuitry configured to: acquire a voxel value of volume data, memory, an opacity curve which indicates a relationship between the voxel value and an opacity value, an extinction modulation model which indicates a relationship between a extinction value of the voxel and the opacity value, and a transmission modulation model which indicates a relationship between a transmission value of the voxel and the opacity value, set, the opacity value based on the voxel value and the opacity curve, and an optical model corresponding to the voxel value, based on the opacity value and based on at least one of the extinction modulation model and the transmission modulation model, rendering the volume data based on the optical model and the voxel value.

The processing circuitry further configured to: apply the extinction modulation model if the opacity value is closer to zero, and the transmission modulation model if the opacity is closer to full.

The invention claimed is:

1. A medical image processing apparatus comprising:
processing circuitry configured to:
  obtain volumetric medical imaging data comprising a voxel value,
  obtain an opacity value corresponding to the voxel value,
  obtain an extinction color and/or transmission color corresponding to the voxel value,
  modify the extinction color and/or transmission color using the opacity value,
    wherein modifying the extinction color and/or transmission color is performed using a combined opacity model that combines a first opacity model and a second opacity model different from the first opacity model, such that there is a range of opacity values for which the modifying comprises applying both the first opacity model and the second opacity model in varying proportions, such that the first opacity model makes a higher contribution to the modifying than the second opacity model at a lower part of the range of opacity values in which both the first opacity model and the second opacity model are applied, and such that the second opacity model makes a higher contribution to the modifying than the first opacity model at a higher part of the range of opacity values in which both the first opacity model and the second opacity model are applied, wherein the modifying is performed using a linear combination of the first opacity model and the second opacity model for values of opacity greater than 0% and less than 100%, wherein the first opacity model comprises an extinction modulation model and the second opacity model comprises a transmission modulation model, the extinction modulation model being used only for an opacity value of 0%, and the transmission modulation model being used only for an opacity value of 100%, wherein modifying the extinction color using the extinction modulation model comprises multiplying the extinction color by the opacity value for the values of opacity greater than 0% and less than 100%, and wherein modifying the transmission color using the transmission modulation model comprises obtaining a transparency value from the opacity value and multiplying the transmission color by the transparency value for the values of opacity greater than 0% and less than 100%, and render the volumetric medical imaging data using the modified extinction color and/or transmission color.

2. The apparatus according to claim 1, wherein the combined opacity model is such that modifying the transmission color and/or extinction color using an opacity value of 0% results in full transmission, and modifying the transmission color and/or extinction color using an opacity value of 100% results in full opacity.

3. The apparatus according to claim 1, wherein the rendering comprises a color-dependent absorption process.

4. The apparatus according to claim 1, wherein the rendering comprises global illumination rendering.

5. The apparatus according to claim 1, wherein an interpolation function is used to interpolate between the first opacity model and the second opacity model over the range of opacity values.

6. The apparatus according to claim 5, wherein the interpolation function comprises a linear function, such that the combined opacity model transitions linearly from the first opacity model to the second opacity model with increasing opacity.

7. The apparatus according to claim 1, wherein the opacity value is obtained using an opacity curve which defines a relationship between voxel value and opacity value.

8. The apparatus according to claim 1, wherein the extinction color and/or transmission color is obtained using a color mapping function which defines a relationship between voxel value and opacity value.

9. The apparatus according to claim 1, wherein the obtaining of the opacity value, extinction color and/or transmission color comprises receiving a user input comprising or representative of the opacity value, extinction color and/or transmission color.

10. The apparatus according to claim 1, wherein:
the volumetric medical imaging data comprises a plurality of voxels having different voxel values; and
the processing circuitry is configured to:
    obtain a respective opacity value and respective extinction color and/or transmission color for each of the voxel values;
    modify the extinction colors and/or transmission colors using the combined opacity model; and
    render the image from the volumetric medical imaging data using the modified extinction colors and/or transmission colors.

11. The apparatus according to claim 1, wherein the processing circuitry is further configured to obtain a value for a deepening factor that is representative of saturation, and wherein the modifying of the extinction color and/or transmission color is in dependence on the value for the deepening factor.

12. The apparatus according to claim 11, wherein the modifying of the transmission color comprises multiplying the transmission color by the value for the deepening factor.

13. The apparatus according to claim 11, wherein the processing circuitry is further comprised to determine a spatial variation of the deepening factor based on additional volumetric data, and to apply the deepening factor to the volumetric imaging data set in dependence on the volumetric data.

14. The apparatus according to claim 13, wherein the additional volumetric data comprises image fusion data.

15. A medical image rendering method comprising:
    obtaining volumetric medical imaging data comprising a voxel value;
    obtaining an opacity value corresponding to the voxel value;
    obtaining an extinction color and/or transmission color corresponding to the voxel value;
    modifying the extinction color and/or transmission color using the opacity value,
    wherein the modifying of the extinction color and/or transmission color is performed using a combined opacity model that combines a first opacity model and a second opacity model different from the first opacity model, such that there is a range of opacity values for which the modifying comprises applying both the first opacity model and the second opacity model in varying proportions, such that the first opacity model predominates at a low part of the range of opacity values in which both the first opacity model and the second opacity model are applied, and such that the second opacity model predominates at a high part of the range of opacity values in which both the first opacity model and the second opacity model are applied,
    wherein the modifying is performed using a linear combination of the first opacity model and the second opacity model for values of opacity greater than 0% and less than 100%,
    wherein the first opacity model comprises an extinction modulation model and the second opacity model comprises a transmission modulation model, the extinction modulation model being used only for an opacity value of 0%, and the transmission modulation model being used only for an opacity value of 100%,
    wherein modifying the extinction color using the extinction modulation model comprises multiplying the extinction color by the opacity value for the values of opacity greater than 0% and less than 100%, and wherein modifying the transmission color using the transmission modulation model comprises obtaining a transparency value from the opacity value and multiplying the transmission color by the transparency value for the values of opacity greater than 0% and less than 100%; and rendering the volumetric medical imaging data using the modified extinction color and/or transmission color.

16. A medical image processing apparatus comprising: processing circuitry configured to:

obtain volumetric medical imaging data comprising a voxel value, obtain an extinction color and/or transmission color corresponding to the voxel value, obtain a value for a deepening factor that is representative of saturation, modify the extinction color and/or transmission color using the value for the deepening factor, wherein modifying the extinction color and/or transmission color is further performed using a combined opacity model that combines a first opacity model and a second opacity model different from the first opacity model, such that there is a range of opacity values for which the modifying comprises applying both the first opacity model and the second opacity model in varying proportions, such that the first opacity model makes a higher contribution to the modifying than the second opacity model at a lower part of the range of opacity values in which both the first opacity model and the second opacity model are applied, and such that the second opacity model makes a higher contribution to the modifying than the first opacity model at a higher part of the range of opacity values in which both the first opacity model and the second opacity model are applied, wherein the modifying is performed using a linear combination of the first opacity model and the second opacity model for values of opacity greater than 0% and less than 100%, wherein the first opacity model comprises an extinction modulation model and the second opacity model comprises a transmission modulation model, the extinction modulation model being used only for an opacity value of 0%, and the transmission modulation model being used only for an opacity value of 100%, wherein modifying the extinction color using the extinction modulation model comprises multiplying the extinction color by the deepening factor for the values of opacity greater than 0% and less than 100%, and wherein modifying the transmission color using the transmission modulation model comprises obtaining a transparency value from the deepening factor and multiplying the transmission color by the transparency value for the values of opacity greater than 0% and less than 100%, and render the volumetric medical imaging data using the modified extinction color and/or transmission color.

* * * * *